US010661595B2

(12) United States Patent
Kurani et al.

(10) Patent No.: US 10,661,595 B2
(45) Date of Patent: May 26, 2020

(54) METHODS AND SYSTEMS OF MULTIFUNCTIONAL WRITING DEVICE

(71) Applicants: Hemal B Kurani, Sunnyvale, CA (US); Hetal B Kurani, Sunnyvale, CA (US)

(72) Inventors: Hemal B Kurani, Sunnyvale, CA (US); Hetal B Kurani, Sunnyvale, CA (US)

(*) Notice: Subject to any disclaimer, the term of this patent is extended or adjusted under 35 U.S.C. 154(b) by 0 days.

(21) Appl. No.: 16/680,345

(22) Filed: Nov. 11, 2019

(65) Prior Publication Data

US 2020/0079136 A1    Mar. 12, 2020

Related U.S. Application Data

(63) Continuation-in-part of application No. 15/897,157, filed on Feb. 15, 2018, now abandoned.

(60) Provisional application No. 62/470,332, filed on Mar. 12, 2017.

(51) Int. Cl.
| | |
|---|---|
| *B43K 29/00* | (2006.01) |
| *B43L 7/00* | (2006.01) |
| *B43K 29/08* | (2006.01) |
| *G06F 3/0354* | (2013.01) |
| *B43L 7/027* | (2006.01) |

(52) U.S. Cl.
CPC .......... *B43K 29/004* (2013.01); *B43K 29/001* (2013.01); *B43K 29/08* (2013.01); *B43L 7/005* (2013.01); *B43L 7/0275* (2013.01); *G06F 3/03545* (2013.01)

(58) Field of Classification Search
CPC .... B43K 27/02; B43K 29/001; B43K 29/004; B43K 29/08; B43K 29/10; B43K 29/20

USPC ................................................... 33/458, 275
See application file for complete search history.

(56) References Cited

U.S. PATENT DOCUMENTS

| | | | | |
|---|---|---|---|---|
| 1,539,912 | A * | 6/1925 | Peterson .................. | G01C 9/24 33/332 |
| 1,544,471 | A * | 6/1925 | Miller ...................... | G01B 3/06 33/458 |
| 1,725,263 | A * | 8/1929 | Fleischman .............. | B25H 7/04 33/473 |
| 5,894,675 | A * | 4/1999 | Cericola .............. | G01B 3/1071 33/451 |
| 6,230,416 | B1 * | 5/2001 | Trigilio ................... | B43L 7/027 33/451 |
| 6,578,274 | B1 * | 6/2003 | Tango, Jr. ................ | B44D 3/38 33/1 G |

(Continued)

*Primary Examiner* — Yaritza Guadalupe-McCall

(57) ABSTRACT

A multifunctional writing device comprising a hollow body, wherein the hollow body comprises one or more cavities configured to store a protractor, a ruler, a set square thirty/sixty-degree (30/60°) triangle, a set square forty-five-degree (45°) triangle, a compass needle, a USB flash drive, a stylus, and an eraser. A first writing member comprises lead and a mechanical pencil system being provided in a first portion of the hollow body. A second writing member comprising a pen system being provided in a second portion of the hollow body. A magnetic lock attaches and stores a protractor, a ruler, a set square thirty/sixty-degree (30/60°) triangle, a set square forty-five-degree (45°) triangle, and a compass needle inside a cavity. A protractor, a ruler, a set square thirty/sixty-degree (30/60°) triangle, and a set square forty-five-degree (45°) triangle are removed from a cavity by pulling rectangular strip top portion.

20 Claims, 10 Drawing Sheets

(56) References Cited

U.S. PATENT DOCUMENTS

| | | | | |
|---|---|---|---|---|
| 6,839,974 | B1* | 1/2005 | Hitchcock | B25H 7/00 33/419 |
| 10,001,370 | B2* | 6/2018 | Foster | B25H 7/04 |
| 10,239,200 | B2* | 3/2019 | Pepper | B25H 7/02 |
| D870,810 | S* | 12/2019 | Kurani | D19/133 |
| 2007/0084073 | A1* | 4/2007 | Martin | B25H 7/005 33/520 |
| 2007/0277387 | A1* | 12/2007 | Morrell | B25H 7/00 33/429 |
| 2009/0064516 | A1* | 3/2009 | Diaz | G01C 9/26 33/451 |
| 2012/0036727 | A1* | 2/2012 | McCarthy | B43L 23/00 33/760 |
| 2012/0240419 | A1* | 9/2012 | Wagner | B43L 7/12 33/275 R |
| 2012/0317824 | A1* | 12/2012 | Kelly | G01C 15/12 33/286 |
| 2019/0070891 | A1* | 3/2019 | Kurani | B43K 29/08 |

* cited by examiner

METHODS AND SYSTEMS OF MULTIFUNCTIONAL WRITING DEVICE

CLAIM OF PRIORITY

This application is a continuation-in-part of U.S. patent application Ser. No. 16/385,473 filed on Apr. 16, 2019. U.S. patent application Ser. No. 16/385,473 is a continuation in part of and claims priority to U.S. patent application Ser. No. 15/897,157, filed on Feb. 15, 2018. United States Patent Application No. claims priority from U.S. provisional Application No. 62/470,332 filed on Mar. 12, 2017. These patent applications are incorporated herein by reference in their entirety.

FIELD OF THE INVENTION

This application relates generally to writing instruments, and more specifically to a system, an article of manufacture and a method of a multifunctional writing device.

DESCRIPTION OF THE PRIOR ART

Various multifunctional writing devices in the art are known for their uses as input devices on paper and paperless mediums. Ball point pens and mechanical pencils are known pen input devices available for paper mediums. They are usually in the form of the ink cartridge and pencil lead feeder inside the hollow body. The passive stylus devices are known to be used as pen input devices on paperless mediums like electronic devices, including touch screen displays with touch-sensitive transparent panels covering the screen. They are made from a material that will not scratch the surface of a touch screen display. The geometry tools like compasses, rulers, protractors, and set squares are usually individual pieces made from various materials.

U.S. Pat. No. 1,544,471 to Miller discloses a combination tool with elements necessary to the use of a carpenter in laying off work of various kinds and to make the construction simple. The tools housed are ruler, caliper, blade, and a pencil. Miller shows that ruler, caliper and blade are held into position by clamping screw. The caliper and blade are stored inside the housing. The pencil is retained inside the pencil holder. Miller discloses a combination tool comprising a stock provided with a longitudinal slot in one edge portion, a blade pivotally connected with the stock at one end thereof and capable of any position between that of perpendicularity to the stock and folded position within the slot, slide mounted on the blade. A pencil holder is carried by the stock on the edge opposite the slot, means being provided for holding the pencil. Miller discloses caliper which can be used as compass needle. Miller discloses one barrel housing for caliper and blade tools and separate housing for pencil. The ruler is attached to the caliper and blade housing.

Unfortunately, such combination tools to the use of a carpenter which include lead pencil, compass-needle, and a ruler has dedicated different tubular housings for each tool, with big clamping screws that take time and effort to open and close tools, do not work on paperless mediums, are bulky and only have limited utility in school and work environments, and electronic devices with touch screen displays. Thus, there is a need for multifunctional writing devices in a single tubular housing with quick removal from a storage cavity and effortless quick opening and closing of a tool. The locking mechanism should have no moving parts to bind or wear out. The multifunctional writing device should be light weight and user should be able to use on paper and paperless mediums.

Today, almost all people have a pen or pencil with them, because they are so light and easy to carry around. People have also found all sorts of ways to make them look diverse and have added so many new functions to them in our contemporary society. People have also used styluses, pencils, geometry tools like compasses, protractors, rulers, set squares and other fancy stationary supplies, but they have to carry and use multiple devices.

In stores these days, most of the products in this device are sold at exorbitant prices, individually or in some combination based on prior art solutions. A further problem is compounded where drawing tools do not exist, for example; a compass, a protractor, a ruler, and set squares in a single device. The problem exists where person has to purchase, carry and use multiple devices. However, this affordable innovative device combines all of them in a single housing. School kids will not have to lug a whole box of pens, pencils and drawing sets to school; instead, they will be able to transport all of the most critical writing and drawing tools in only one device.

Teachers, architects, engineers, builders, construction worker, doctors, scientists, astronomers, cosmonauts, police, firefighters, etc. will not have to carry multiple devices; instead they will only need this device comprising all the input writing and drawing sets at the reasonable price. The benefits are many, for e.g. the device consisting of all commonly used tools will help students who cannot afford individual, costly school supplies, reduce the cost of school classroom supplies, and a person only has to carry a single device instead of multiple items. This allows for less worry about breaking or losing individual items and reduces waste since the device is reusable and environmentally friendly. Thus, there remains a considerable need for a device that can conveniently store, in a single housing, a ball point pen, mechanical pencil, eraser, stylus for touch screen, protractor, ruler, set square thirty/sixty-degree (30/60°), set square of forty-five-degree (45°) triangle, a compass, USB flash drive, and a grip.

SUMMARY OF THE INVENTION

In one aspect, a multifunctional writing device includes a hollow body, wherein the hollow body comprises one or more cavities configured to store a protractor, a ruler, a set square thirty/sixty-degree (30/60°) triangle, a set square forty-five-degree (45°) triangle, a compass needle, a USB flash drive, a stylus, and an eraser. A first writing member comprises lead and a mechanical pencil system being provided in a first portion of the hollow body. A second writing member comprising a pen system being provided in a second portion of the hollow body. A magnetic lock attaches and stores a protractor, a ruler, a set square thirty/sixty-degree (30/60°) triangle, a set square forty-five-degree (45°) triangle, and a compass needle inside a cavity. A protractor, a ruler, a set square thirty/sixty-degree (30/60°) triangle, and a set square forty-five-degree (45°) triangle are removed from a cavity by pulling rectangular strip top portion.

Figure 1:
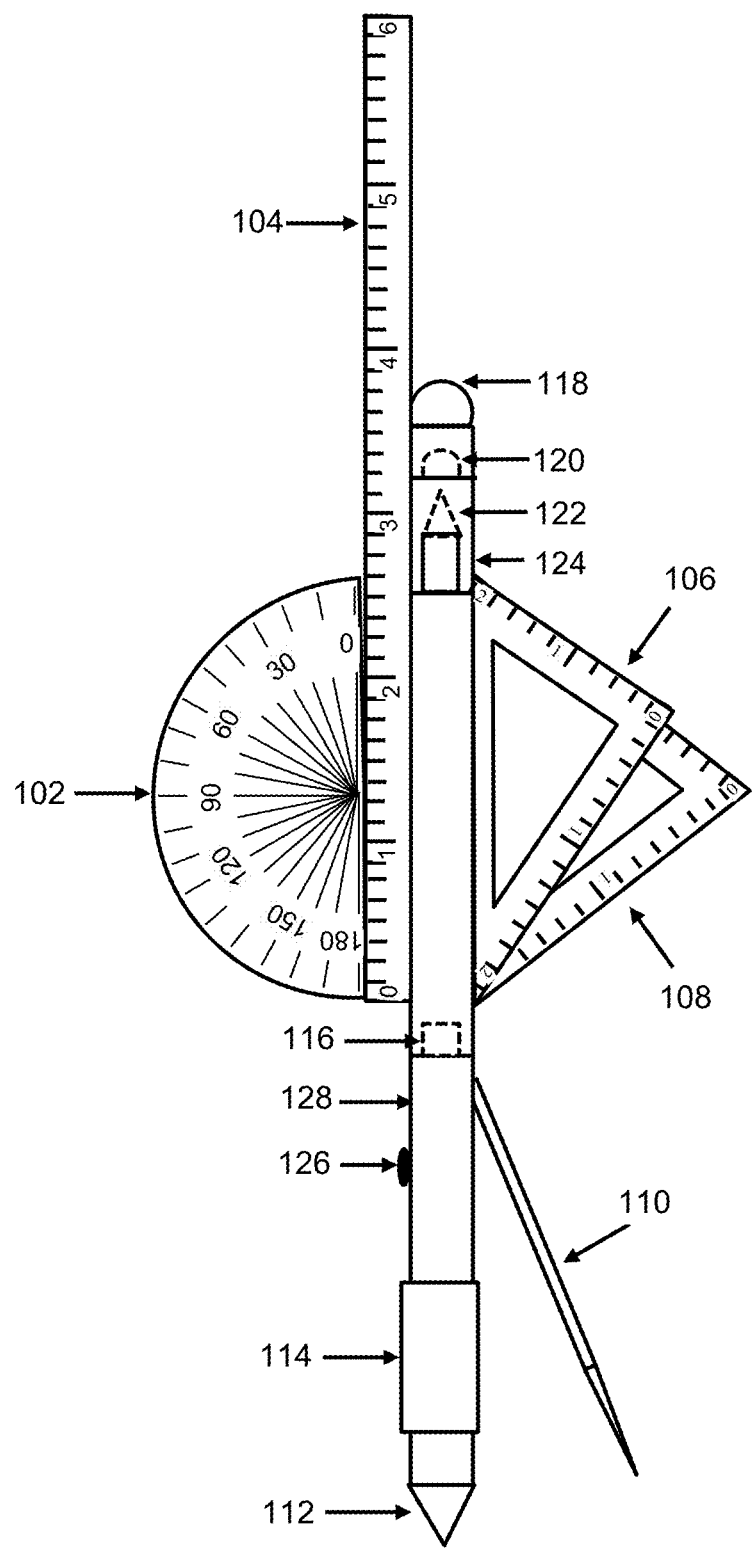
FIG. 1 illustrates a top plan view of a multifunctional writing device with geometry tools in the extended position, according to some embodiments.

The Figures described above are a representative set and are not an exhaustive with respect to embodying the invention.

DESCRIPTION

Disclosed is a system, method, and article of manufacture for methods and systems of multifunctional writing device. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of open and closed position of various drawing tools, buttons to lock and unlock the tools, etc., in order to provide a thorough understanding of embodiments of the invention. One who is skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

Exemplary Definitions

Compass can be a drawing tool used to inscribe circles, arcs, etc. A compass can be a piece of equipment used for drawing circles, consisting of two thin parts joined in the shape of the letter V. A compass can be piece of equipment used for measuring or drawing lines and angles, consisting of two pieces of metal or other materials with pointed ends that are joined together at the top. As dividers, a compass can also be used as a tool to measure distances (e.g. on maps and the like). A compass can be for mathematics, drafting, navigation, and other purposes.

Eraser can be a soft rubber or plastic, used to remove something written.

Grip can be a soft rubber or plastic, used to more easily hold and use the multifunctional writing device when writing or drawing.

Hinge can be a movable joint or mechanism on which rectangular strips swing as they open or close. A hinge can connect two solid objects.

Magnet can be piece of iron that has its component atoms so ordered that the material exhibits properties of magnetism, such as, attracting other iron containing ferromagnetic materials such as iron, cobalt, nickel and gadolinium.

Magnetism can be a physical phenomenon produced by the motion of an electric charge, resulting in attractive and repulsive forces.

Magnetic lock can be a locking system that consists of a permanent magnet object which attaches itself to a ferromagnetic material made object. Ferromagnetic materials are attracted to permanent magnet because they are full of tinier magnets which align with the field of the larger permanent magnet. A magnetic lock can also consist of two permanent magnet objects with opposite polarities attached to each other. Both of this magnetic lock system allows the two objects to be attached together and cannot be opened unless some force is applied.

Mobile device can include a handheld computing device that includes an operating system (OS) and touch screen that may run various types of application software, also known as apps.

Pen can be a writing implement used to apply ink to a surface, such as paper, for writing or drawing.

Pencil can be a writing implement or art medium constructed of a narrow, solid pigment core inside a protective casing which prevents the core from being broken or leaving marks on the user's hand during use.

Pivot can be can be pin or shaft on which a mechanism turns or folds.

Protractor can be an instrument for measuring angles. A protractor can measure angles in degrees (°). A radian-scale protractor measures angles in radians. A protractor can be divided into one-hundred and eighty (180) equal parts.

Set square can be an object used in engineering and technical drawing, with the aim of providing a straightedge at a right angle or other particular planar angle to a baseline. As an example, a set square can be a forty-five-degree (45°) triangle or a set square thirty/sixty-degree (30/60°) triangle object.

Ruler can be a straight, rectangular device typically marked at regular intervals, used to draw straight lines or measure distances in customary or metric units.

Stylus can be a writing utensil and/or a small tool for some other form of marking or shaping. A small, pen-shaped instrument that is used to input commands to a computer screen, mobile device or graphics tablet. With touchscreen devices, a user can place a stylus on the surface of the screen to draw or make selections by tapping the stylus on the screen. A stylus tip can also be a nib.

Technical drawing tool can be a protractor, a ruler, a set square thirty/sixty-degree (30/60°) triangle, a set square forty-five-degree (45°) triangle, a compass needle. Technical drawing tool can be used for measurements and layouts of drawings.

Universal Serial Bus (USB) is an industry standard that defines cables, connectors and communications protocols for connection, communication, and power supply between computers and devices.

Exemplary Systems and Methods

FIGS. 1-10 illustrate various perspectives and views of an example multifunctional writing device 100, according to some embodiments. Multifunctional writing device 100 can include various other integrated devices, including, inter alia: a pen, a pencil, a stylus for touch screen input device for writing, and a geometry tool kit consisting of a protractor 102, ruler 104, a square thirty/sixty-degree (30/60°) triangle 106, set square forty-five-degree (45°) triangle 108, and a compass needle 110, contained in a single housing and/or any various permutations thereof. It is noted that in some example embodiments, the multifunctional writing device 100 can include various technical drawing tools including but not limited to: pens, compasses, protractors, rulers, and set squares. Drafting tools can be used for the measurement and layouts of drawings, or to improve the consistency and speed when creating standard drawings. The multifunctional writing device 100 can include storage cavities for a ball point pen, pencil lead, a stylus, an eraser, etc. In one example, multifunctional writing device 100 with a hollow body 128 can include a protractor 102, a ruler 104, a set square thirty/sixty-degree (30/60°) triangle 106, a set square forty-five-degree (45°) triangle 108, a compass needle 110, a pencil 112, a grip 114, USB flash drive 116, an eraser 118, a stylus 120 and a pen 122.

In one example embodiment, the multifunctional writing device 100 can enable the user to utilize a single writing system for various purposes. The multifunctional writing device 100 can include a mechanical pencil 112 and ball point pen 122 projecting out from either side to switch from a pen to a pencil with only a flip of the device. The multifunctional writing device 100 can have a stylus 120. The stylus can enable writing and drawing on a touch screen surface. The multifunctional writing device 100 can include an eraser 118 sticking out from the cap of the pen and a customizable grip on the pencil to make the appearance of the device fashionable yet comfortable.

The multifunctional writing device 100 can include mechanisms for storing various drawing tools with said multifunctional writing device. Magnetic lock 340 mechanism can attach or retain a protractor 102, a ruler 104, a set square thirty/sixty-degree (30/60°) triangle 106, a set square forty-five-degree (45°) triangle 108, a compass needle 110 inside a cavity. This can ensure that they do not move inside the cavity during use of pencil 112 and pen 122.

A magnetic lock 360 can also attach the edges of a rectangular strip together when they are completely open to form a protractor, a ruler set square thirty/sixty-degree (30/60°) triangle 106, and a set square forty-five-degree (45°) triangle 108.

The multifunctional writing device 100 can benefit various user types, such as, inter alia: students, teachers, architects, engineers, builders, construction worker, doctors, scientists, astronomers, cosmonauts, police, firefighters, etc. The user can be more organized with one device that serves multiple purposes instead of carrying multiple devices for one use. Some advantages of the multifunctional writing device 100 in various applicable situations such as, inter alia: writing, drawing, etc. For example, the multifunctional writing device 100 can be used when a student performs assignments (e.g. homework, exercises, mathematical drawings, tests, etc.). The multifunctional writing device 100 can be lightweight and composed of various materials such as, inter alia: plastic, wood, carbon fiber, glass, cardboard, foam and/or metal.

Multifunctional writing device 100 includes a conventional pen input device, such as a ball point pen and/or a mechanical pencil lead feeder for use on a paper or other writing medium, and a stylus, for use with a paperless medium, carried in a single housing which includes a cap portion and a barrel portion. In one embodiment, multifunctional writing device 100 also includes a protractor 102, a ruler 104, a set square thirty/sixty-degree (30/60°) triangle 106, a set square forty-five-degree (45°) triangle 108, a compass needle 110, a pencil 112, a grip 114, USB flash drive 116, an eraser 118, a stylus 120 and a pen 122 in a single hollow body 128. In some embodiments, a cap arrangement can be provided that selectively and alternatively allows the ball point pen and/or mechanical pencil lead feeder in a use position, for example, by way of a relatively simple twist of the cap portion with respect to the barrel portion. Embodiments also include drawing tools with a housing, compartment regions, pins, hinges, and an interchangeable implement mounted on one of the pins by means of a coupling mechanism which can be moved by means of a pivot bearing between inwardly pivoted position and outwardly functional position.

The drawing tools allow for various activities and can perform the following example functions: writing; erasing written work; drawing straight lines; making perfect circles; making arcs; drawing accurate angles; measuring angles; etc.

FIG. 1 illustrates a top plan view of a multifunctional writing device 100 with geometry tools in the extended position, according to some embodiments.

A multifunctional writing device 100 comprises a hollow body 128 with one or more cavities configured to store a protractor 102, a ruler 104, a set square thirty/sixty-degree (30/60°) triangle 106, a set square forty-five-degree (45°) triangle 108, a compass needle 110, a USB flash drive 116, a stylus 120, and an eraser 118.

The first writing member comprises lead and a mechanical pencil 112 system provided in a first portion of the hollow body 128, and the first writing tip is axial with respect to the hollow body 128.

The second writing member comprises pen 122 system provided in a second portion of the hollow body 128, and the second writing tip is axial with respect to the hollow body 128. As shown in FIG. 1 the first portion of the hollow body 128 is at an opposite end of the second portion of the hollow body 128.

Multifunctional writing device 100 can include a protractor 102. Protractor 102 can be stored in a cavity of the hollow body 128. Protractor can be used in a detached form.

Protractor 102 can be used to measure angles (e.g. in degrees)(°, radians, etc.). Radian-scale protractors measure angles in radians. For example, protractor 102 can have two (2) sets of numbers. For example, a bottom set can be for angles that open to the left and the upper set of the protractor is used to measure angles that open to the right.

Ruler 104 can be stored in a cavity of the hollow body 128 of multifunctional writing device 100. Ruler 104 can be marked with alpha-numeric text, symbols, lines, etc. on one or both surfaces. Ruler 104 can function as a line gauge. Ruler 104 can be a straightedge with equally spaced markings along its length. The equally spaced lines can mark metric spacing's, in the British imperial and United States customary systems of measurement, etc. The ruler cavity can run adjacent to the protractor cavity.

Thirty/sixty-degree (30/60°) triangle 106 and forty-five-degree (45°) triangle 108 can be set square instruments. Thirty/sixty-degree (30/60°) triangle 106 or forty-five-degree (45°) triangle 108 can be stored in a cavity of the hollow body 128. The thirty/sixty-degree (30/60°) triangle 106 and forty-five-degree (45°) triangle 108 can be used to draw a straightedge at a specified angle. Thirty/sixty-degree (30/60°) triangle 106 and forty-five-degree (45°) triangle 108 are provided by way of example and not of limitation as in other example embodiments; other angles for set square tools can be utilized. Thirty/sixty-degree (30/60°) triangle cavity can run adjacent to the ruler cavity. Forty-five-degree (45°) triangle cavity can run adjacent to thirty/sixty-degree (30/60°) triangle cavity.

Compass needle 110 can be affixed to second portion of the hollow body 128. An affixed compass needle 110 can be retractable and/or otherwise storable in a cavity of hollow body 128.

Writing instrument pencil 112 can be a mechanical-pencil in the first portion of the hollow body 128. Accordingly, the interior portion of multifunctional writing device 100 can include the various mechanisms/devices for mechanical lead pencils. Pencil lead can be advanced using the pencil push button 126.

Writing instrument pen 122 can be a made of ball point cartridge in the second portion of the hollow body 128. Accordingly, the interior portion of multifunctional writing device 100 can include the various mechanisms/devices for ball point pen 122.

Grip 114 can be the portion that part of, or attachment to, hollow body 128 that allows multifunctional writing device 100 to be moved or used by a user's hand. Grip 114 can be formed with a rubber coating and/other material (e.g. thermoplastic, etc.). The material of grip 114 can provide friction against the hand/fingers of user in order to reduce the gripping force needed to achieve a reliable grip on multifunctional writing device 100. USB flash drive 116 can be used as a data storage, data back-up and transfer of computer files.

The tip of the second portion of the hollow body 128 comprises an eraser cap 124 over a tip of the pen system. The eraser cap 124 comprises an eraser 118, and a stylus 120. The user can remove the top of the eraser cap 124 with simple twist and access the stylus 120. An eraser 118 can be a removable end portion of multifunctional writing device 100. Stylus 120 can be attached with friction, screw thread, etc. The pen 122 can be accessed by removing the eraser cap 124.

Hollow body 128 can be the long barrel-housing part of the main body of multifunctional writing device 100. In example embodiments, protractor 102, ruler 104, thirty/sixty-degree (30/60°) triangle 106, forty-five-degree (45°) triangle 108, and a compass needle can be stored in a cavity of hollow body 128. A protractor 102, ruler 104, thirty/sixty-degree (30/60°) triangle 106, forty-five-degree (45°) triangle 108, and a compass needle 110 can be made from plastic, wood, carbon fiber, glass, cardboard, foam and/or metal. Hollow body 128 can be formed from metallic, wood and/or plastic material(s).

The protractor 102, ruler 104, thirty/sixty-degree (30/60°) triangle 106, and forty-five-degree (45°) triangle 108 can be completely removed from the respective cavity of the housing of the multifunction writing device. They can be used as individual, technical drawing instruments.

Figure 2:
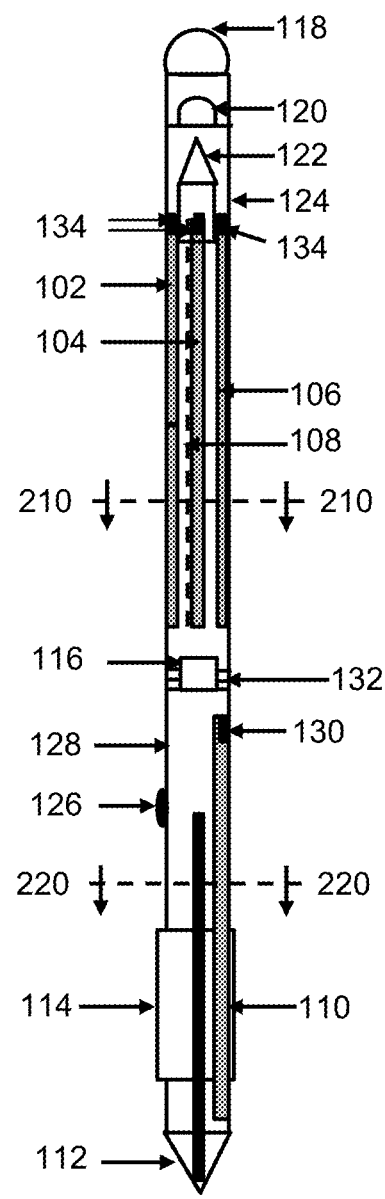
FIG. 2 illustrates side elevation view of a multifunctional writing device with parts in the collapsed position and the front face removed, according to some embodiments.

FIG. 2 illustrates side elevation view 200 of a multifunctional writing device with parts in the collapsed position and the front face removed of a multifunctional writing device 100, according to some embodiments. This view illustrates various internal parts of multifunctional writing device 100.

FIG. 2 also depicts the section on the line 210-210 and on the line 220-220. These are described further in FIG. 3.

Example embodiments are designed to make various technical drawing tools available in a single barrel housing. The protractor 102, ruler 104, thirty/sixty-degree (30/60°) triangle 106, and a forty-five-degree (45°) triangle 108 can be housed in four cavities of the second portion of the hollow body 128. The compass needle 110 is housed in the cavity of the first portion of the hollow body 128.

The protractor 102, ruler 104, thirty/sixty-degree (30/60°) triangle 106, and a forty-five-degree (45°) triangle 108 can have identical cavity sizes.

The protractor 102, ruler 104, thirty/sixty-degree (30/60°) triangle 106, and a forty-five-degree (45°) triangle 108 can be removed from a cavity by simply pulling out the rectangular strip top portion 134.

The protractor 102, ruler 104, thirty/sixty-degree (30/60°) triangle 106, and a forty-five-degree (45°) triangle 108 can be stored inside any of the four cavities by a simple push in the second portion of the hollow body.

The compass needle 110 can be released from the cavity in the first portion of the hollow body 128 by simply clicking the push button 130.

The compass needle 110 can be placed inside the cavity in the first portion of the hollow body 128 by a simple push towards the cavity opening.

Writing instrument pencil 112 can be a mechanical pencil in the first portion of the hollow body 128. Accordingly, the interior portion of multifunctional writing device 100 can include the various mechanisms/devices for pencils. Accordingly, the interior element of the pencil can be in hollow body 128.

Writing instrument pen 122 can be a ball point pen in the second portion of the hollow body 128. Accordingly, the interior portion of multifunctional writing device 100 can include the various mechanisms/devices for pen. Accordingly, the interior element of the pen can be in hollow body 128.

The pen and pencil can be separated into two pieces near the bottom of the USB flash stick 116 by a simple twist around the screw thread 132.

Figure 3:
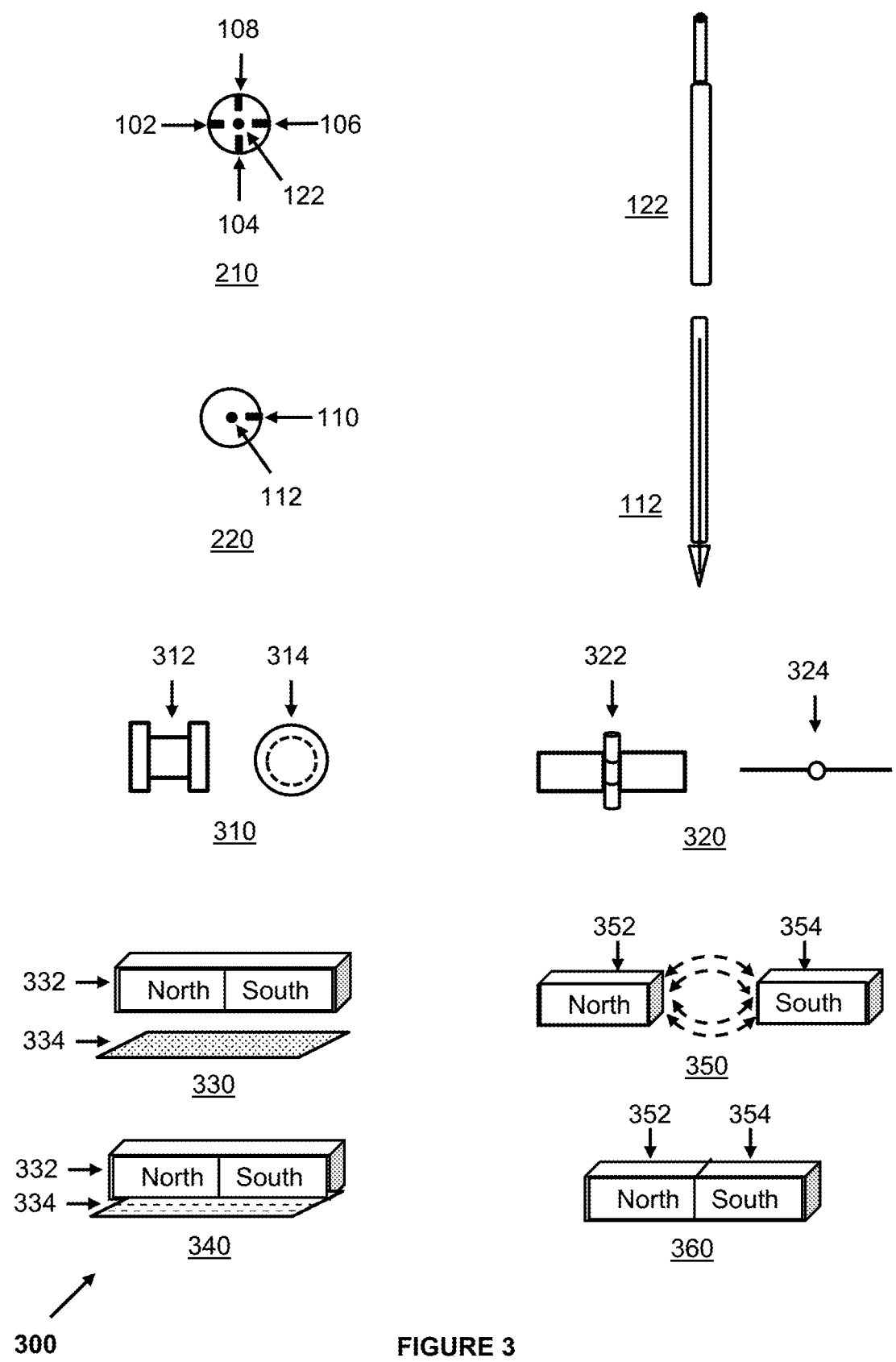
FIG. 3 illustrates items like cross sectional views, pen, pencil, pivot pin, hinge and magnetic lock systems of a multifunctional writing device, according to some embodiments.

FIG. 3 illustrates items 300 like cross sectional views 210 and 220, pen 122, pencil 112, pivot pin 310, hinge 320 and magnetic locks 340 and 360 of a multifunctional writing device 100, according to some embodiments.

Element 210 is a section on the line 210-210 of FIG. 2. An example section view of the protractor 102, ruler 104, thirty/sixty-degree (30/60°) triangle 106, forty-five-degree (45°) triangle 108 housed in the cavities of the second portion of the hollow body 128 is shown. The tools are in a closed position inside the cavities. The pen 122 can be seen in the cross-sectional view.

Element 220 is a section on the line 220-220 of FIG. 2. An example placement of a compass needle 110 housed in the cavity of the first portion of the hollow body 128 is shown. The compass needle 110 is in a retracted position inside the cavity. The mechanical pencil 112 can be seen in the cross-sectional view.

Pivot pin 310 mechanism consisting of short metal pins or bolts is used to hold two rectangular strips of a technical drawing tool together. FIG. 310 illustrates pivot pin front view 312 and side view 314.

The rectangular strips of a protractor 102, a ruler 104, a thirty/sixty-degree (30/60°) triangle 106, and a forty-five-degree (45°) triangle 108 are attached together by the pivot pin 310. It also allows for easy movement of the rectangular strips around the pin.

Hinge 320 can be a movable joint or mechanism on which rectangular strips swings as it opens or closes. It connects two rectangular strips. Hinge 320 illustrates hinge front view 322 and top view 324. Ruler 104 is made of two rectangular strips consisting of hinge 320 in the middle.

A magnetic lock 340 can be a locking mechanism that consists of permanent magnet object 332 and ferromagnetic material object 334. Element 330 illustrates that ferromagnetic material object 334 are attracted to permanent magnet because they are full of tinier magnets which align with the field of the larger permanent magnet 332. The permanent magnet object 332 attaches to a ferromagnetic material object 334 when they are very close.

The protractor 102, ruler 104, thirty/sixty-degree (30/60°) triangle 106, a forty-five-degree (45°) triangle 108, and a compass needle 110 are made of permanent magnet and are attached to ferromagnetic material based cavities using magnetic lock 340.

A magnetic lock 360 can be a locking mechanism that consists of two permanent magnetized edges 352 and 354 with opposite polarity. As show in element 350, the permanent magnet has a distinct north and south magnetic pole. North pole 352 of one magnet is attracted towards the South pole 354 of another magnet. This magnetic principle is used to create magnetic lock between 2 rectangular strips or plates with opposite polarity near the pivot pin or hinge of the technical drawing tools when they are in open position.

A magnetic lock 360 mechanism attaches a protractor, a ruler, a set square thirty/sixty-degree (30/60°) triangle, and a set square forty-five-degree (45°) triangle rectangular strips together in the open position. In a completely open position, the two rectangular strips contain opposite polarities around the pivot pin, ensuring the tools remains locked during usage.

Figure 4:
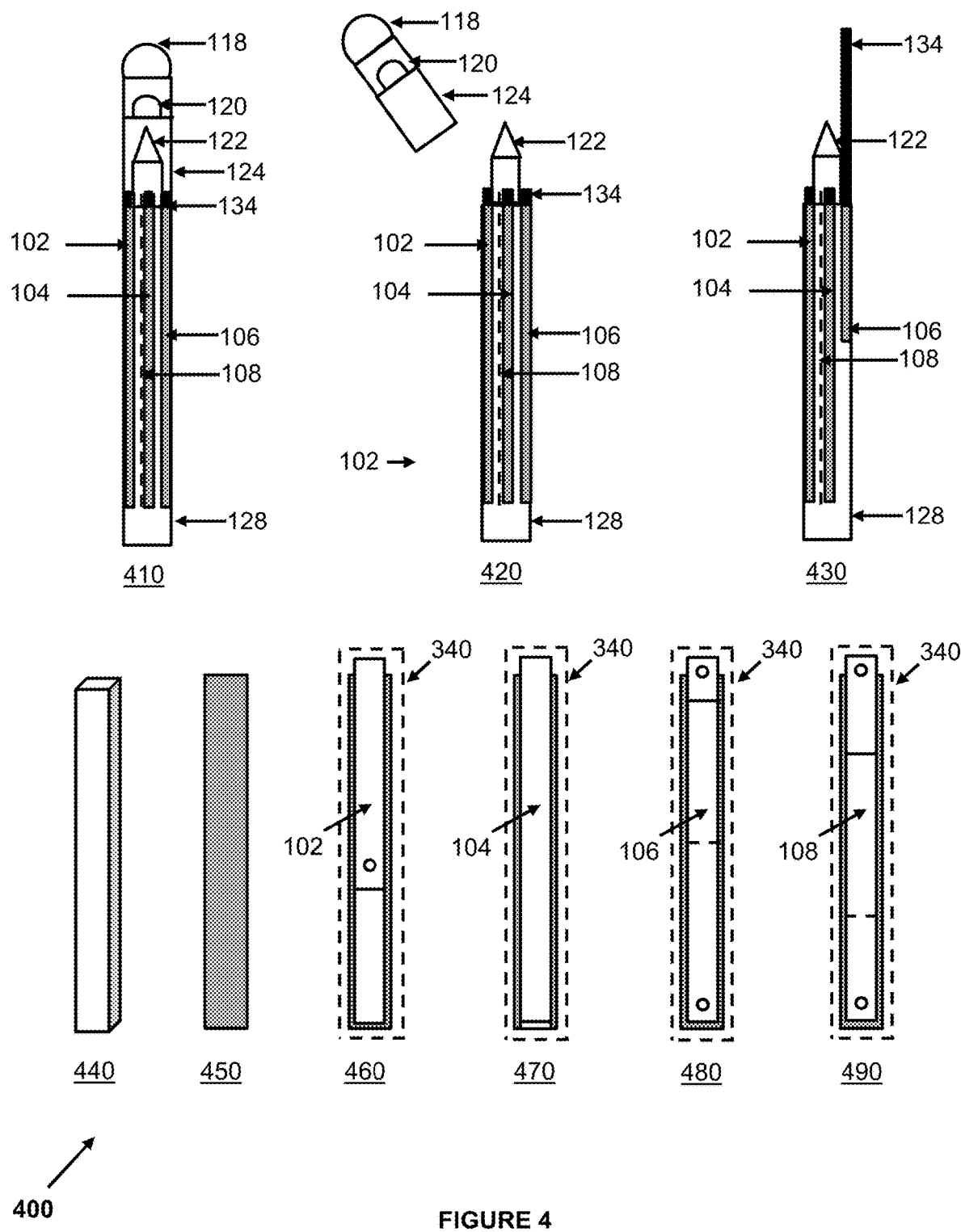
FIG. 4 illustrates an example side elevation view of a multifunctional writing device with parts in the collapsed position and the front face removed showing various technical drawing tools stored inside cavities, according to some embodiments.

FIG. 4 illustrates an example side elevation view 400 of a multifunctional writing device 100 with parts in the collapsed position and the front face removed showing various technical drawing tools inside cavities, according to some embodiments. Side elevation view 400 illustrates various steps to access the technical drawing tools from the cavities.

The technical drawing tools are stored or retained inside the cavities as depicted in element 410. The technical drawing tools can be accessed after eraser cap 124 is removed as shown in element 420. The protractor 102, ruler 104, thirty/sixty-degree (30/60°) triangle 106, and a forty-five-degree (45°) triangle 108 can now be removed from the cavity second portion of the hollow body 128 by pulling the rectangular strip top portion 134 as illustrated in element 430.

The magnetic lock 340 attaches and stores a protractor 102, a ruler 104, a set square thirty/sixty-degree (30/60°) triangle 106, a set square forty-five-degree (45°) triangle 108, and a compass needle 110 inside a cavity when the technical drawing tools are not in use.

Element 440 is an isometric view of a cavity inside which any of the protractor 102, ruler 104, thirty/sixty-degree (30/60°) triangle 106, or a forty-five-degree (45°) triangle 108 can be stored or retained. Element 450 illustrates empty cross sectional view of a cavity.

Technical drawing tool cavities are made of ferromagnetic material such as iron, cobalt, nickel and gadolinium. This allows the protractor 102, ruler 104, thirty/sixty-degree (30/60°) triangle 106, forty-five-degree (45°) triangle 108, and a compass needle 110 with permanent magnet properties to be stored and magnetically locked or retained in a place inside a cavity of hollow body 128. The magnetic lock 340 ensures that the stored technical drawing tools do not move inside the cavity during the use of multifunctional writing device 100 pencil 112, pen 122, USB 116, eraser 118 and stylus 122.

Element 460 shows a protractor 102 in a closed position magnetically attached and stored in a protractor cavity in the second portion of the hollow body 128. The magnetic lock 340 attaches the protractor 102 inside the cavity.

Element 470 shows a ruler 104 in a closed position magnetically attached and stored in a ruler cavity and runs adjacent to the protractor cavity in the second portion of the hollow body 128. The magnetic lock 340 attaches the ruler 104 inside the cavity.

Element 480 shows a set square thirty/sixty-degree (30/60°) triangle 106 in a closed position magnetically attached and stored in a set square thirty/sixty-degree (30/60°) triangle cavity and runs adjacent to the ruler cavity in the second portion of the hollow body 128. The magnetic lock 340 attaches the set square thirty/sixty-degree (30/60°) triangle 106 inside the cavity.

Element 490 shows a set square forty-five-degree (45°) triangle 108 in a closed position magnetically attached and stored in a set square forty-five-degree (45°) triangle cavity and runs adjacent to the set square thirty/sixty-degree (30/60°) triangle cavity in the second portion of the hollow body 128. The magnetic lock 340 attaches the set square forty-five-degree (45°) triangle 108 inside the cavity.

As shown in the elements 460, 470, 480, 490 a protractor 102, a ruler 104, a set square thirty/sixty-degree (30/60°) triangle 106, and a set square forty-five-degree (45°) triangle 108 in a closed position are all of the same length, width and thickness. As such they can be magnetically attached and stored inside any cavity in a second portion of the hollow body 128.

Figure 5:
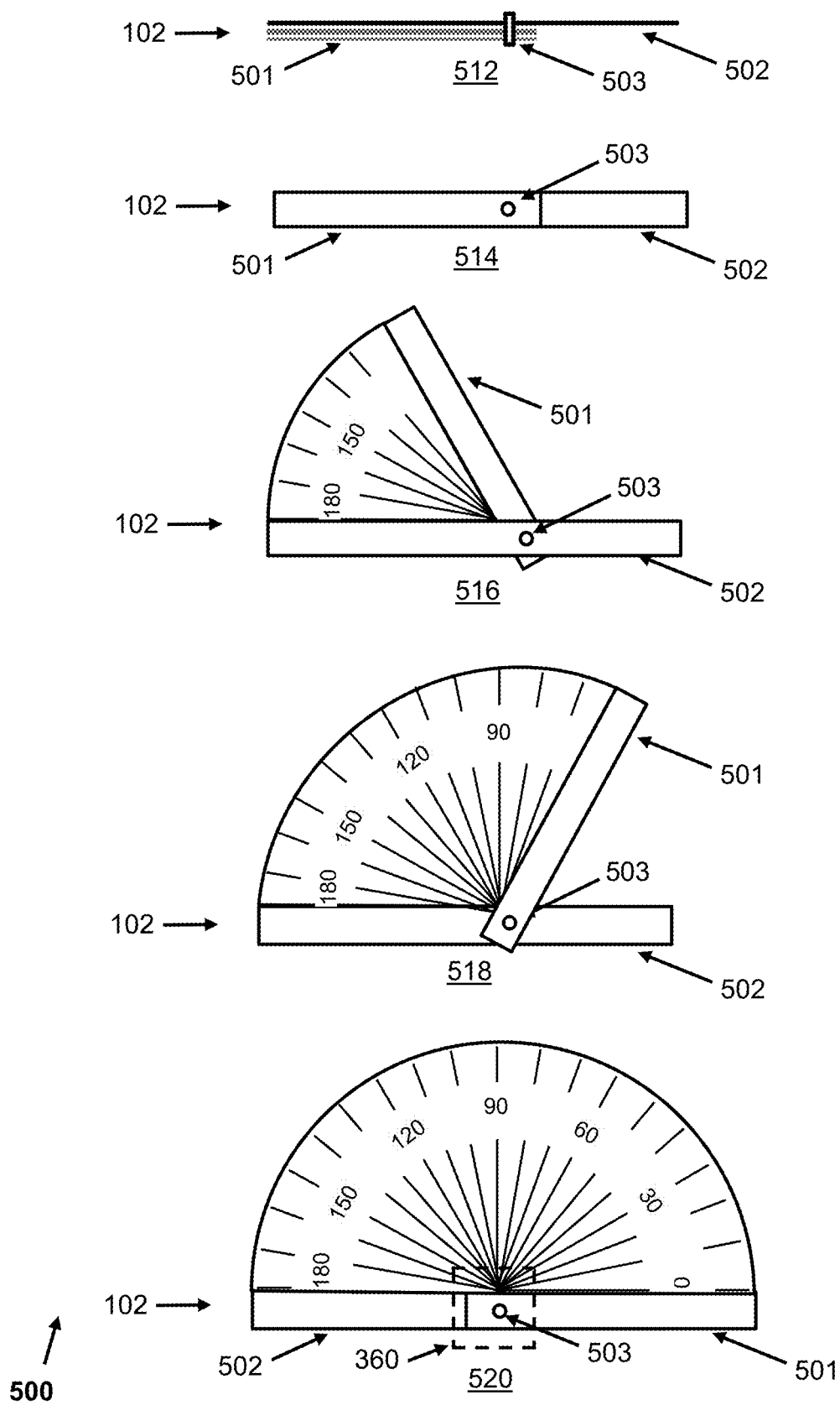
FIG. 5 illustrates an example top view and front view of a multifunctional writing device showing steps to open and close a protractor, according to some embodiments.

FIG. 5 illustrates an example top view and front view 500 of a multifunctional writing device 100, showing steps to open and close a protractor 102, according to some embodiments.

As seen in FIG. 5, the principle of operation is similar to opening and closing a handheld folded fan, containing slats, around a pivot.

The components of the protector 102 are shown in the top view 512. It consists of the first rectangular strip 501 containing thin slats, a second rectangular strip 502, and a pivot pin 503, The thin slats are made up of leaves with ribs or slips. In a fully open position, the leaves will form a semicircle with angle measures in degrees.

The protractor 102 slats revolve around a pivot pin 503 to open or close.

The steps to open a protractor 102 are as follows:

1. First remove the cap 124 from multifunctional device 100 by slightly twisting it to the left.

2. Pull the protractor 102 by grasping the accessible rectangular strip top portion 134 with fingers, from multifunctional device 100. The top view 512 of the protractor 102 shows the first rectangular strip 501 with thin slats, a second rectangular strip 502, and a pivot pin 503.

3. Hold the protractor 102 in front face view 514 position.

4. The protractor 102 first rectangular strip 501 with thin slats can be opened around a pivot pin 503 by rotating it to the right side as shown in elements 516, 518 and 520.

5. In a fully open position, the protractor 102 is in semicircle form as shown in element 520. A protractor 102 is attached in an open position by a magnetic lock 360 around a pivot pin 503. A magnetic lock 360 mechanism attaches protractor 102, first rectangular strip 501, and second rectangular strip 502 around pivot pin 503 in the open position ensuring it remains locked during use.

The protractor 102 is attached in an open position by a magnetic lock 360 around a pivot pin 503.

The protractor 102 can be closed by following the steps 3, 4 and 5 in reverse order and then inserting and storing it in any of the 4 empty cavities in the second portion of the hollow body 128.

Figure 6:
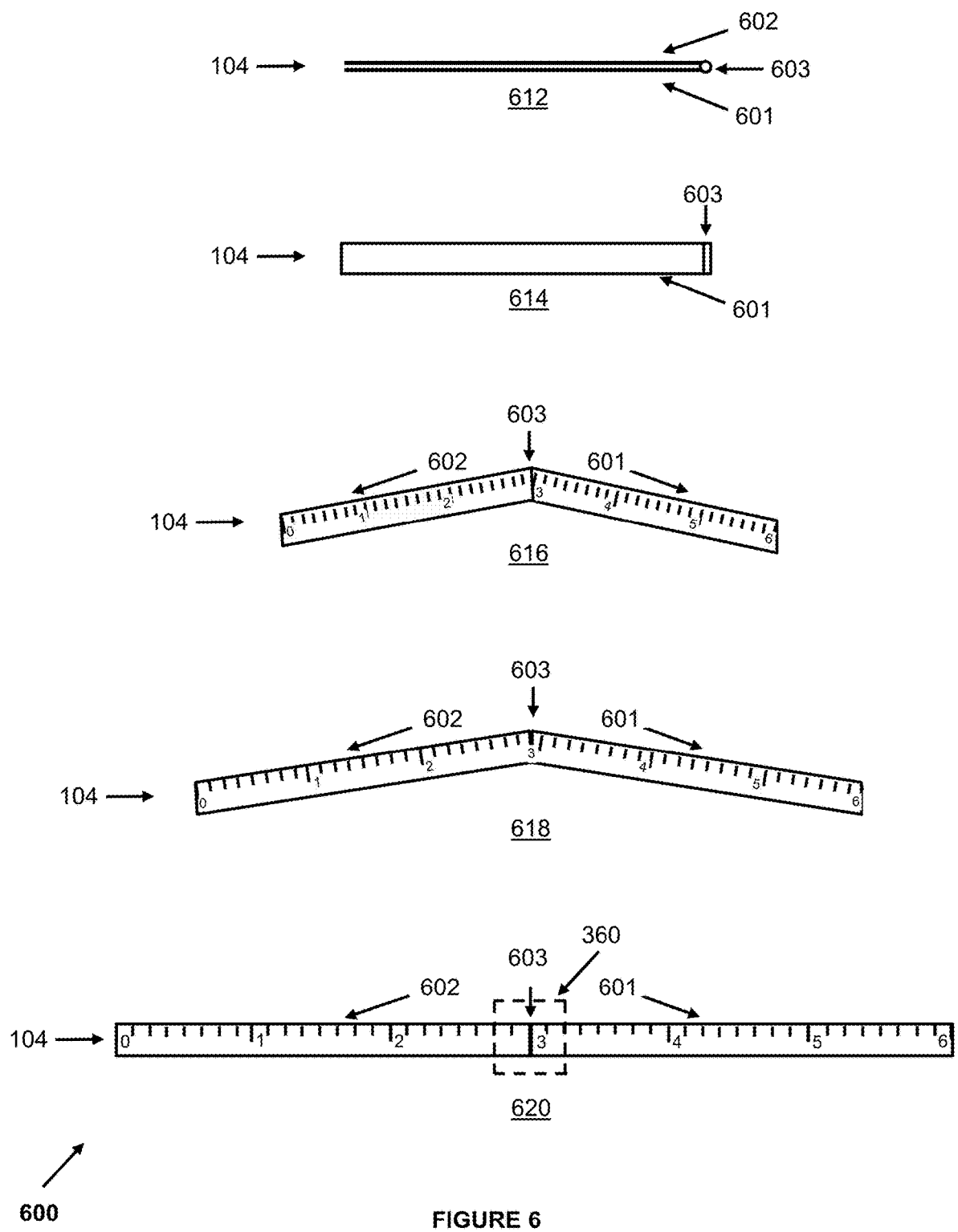
FIG. 6 illustrates an example top view and front view of a multifunctional writing device showing steps to open and close a ruler, according to some embodiments.

FIG. 6 illustrates an example top view and front view 600 of a multifunctional writing device 100 showing the steps to open and close a ruler 104, according to some embodiments.

As seen in FIG. 6, the principle of operation to open ruler 104 is similar to opening of a bifold door around a hinge.

The components of the ruler 104 is shown in the top view 612. It consists of rectangular strips 601, 602 and a hinge 603. In a fully open position, the rectangular strips form a ruler 104 marked at regular intervals in order to draw straight lines or measure distances.

The ruler 104 has a bifold hinge 603 between two rectangular strips 601, 603 to open or close.

The steps to open a ruler 104 are as follows:

1. First remove the cap 124 from multifunctional device 100 by slightly twisting it to the left.

2. Pull the ruler 104 by grasping with fingers accessible rectangular strip top portion 134 from multifunctional device 100. The top view 612 of the ruler 104 shows first rectangular strip 601, a second rectangular strip 602, and a pivot pin 603, 3. Hold the ruler 104 in the front face view 614 position.

4. The ruler 104 can be opened around a hinge 603 by pulling the first rectangular strip 601 and second rectangular strip 602 against each other as shown in the elements 616, 618 and 620.

5. In a fully open position, the ruler 104 is in rectangular form as shown in element 620. A ruler 104 is attached in an open position by a magnetic lock 360 around a hinge 603. A magnetic lock 360 mechanism attaches ruler 104 first rectangular strip 601 and second rectangular strip 602 around hinge 603 in the open position, ensuring it remains locked during use.

The ruler 104 is attached in an open position by a magnetic lock 360 around a bifold hinge 603.

The ruler 104 can be closed by following the steps 3, 4 and 5 in reverse order and then inserting and storing it in any of the 4 empty cavities in the second portion of the hollow body 128.

Figure 7:
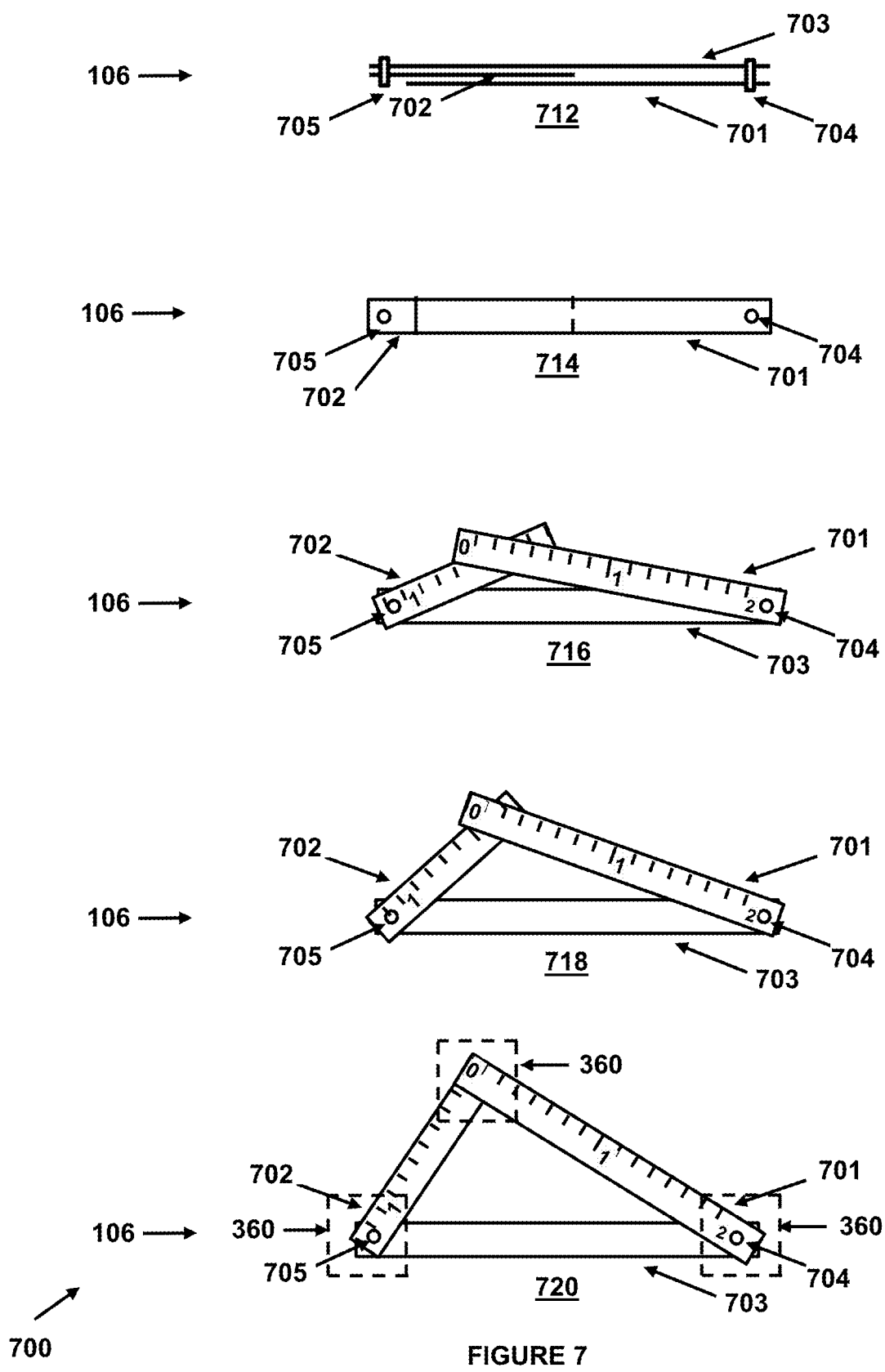
FIG. 7 illustrates an example top view and front view of a multifunctional writing device showing steps to open and close a set square thirty/sixty-degree (30/60°) triangle, according to some embodiments.

FIG. 7 illustrates an example top view and front view 700 of a multifunctional writing device 100 showing steps to open and close a set square thirty/sixty-degree (30/60°) triangle 106, according to some embodiments.

FIG. 7 illustrates the opening and closing of a set square thirty/sixty-degree (30/60°) triangle 106. The principle of operation to open a set square thirty/sixty-degree (30/60°) triangle 106 is similar to that of opening arms, which can be opened or closed around two pivots.

The components of the set square thirty/sixty-degree (30/60°) triangle 106 is shown in the top view 712. It consists of rectangular strips 701, 702, 703 and pivot pins 704, 705. In a fully open position, the rectangular strips form a set square thirty/sixty-degree (30/60°) triangle 106 with the aim of providing a straightedge at a right angle or other particular planar angles to a baseline.

The set square thirty/sixty-degree (30/60°) triangle 106 two rectangular strips 701, 702 revolve around two pivot pins 704, 705 to open or close.

The steps to open a set square thirty/sixty-degree (30/60°) triangle 106 are as follows:

1. First remove the cap 124 from multifunctional device 100 by slightly twisting it to the left.

2. Pull the set square thirty/sixty-degree (30/60°) triangle 106 by grasping accessible rectangular strip top portion 134 with fingers from multifunctional device 100. The top view 712 of the set square thirty/sixty-degree (30/60°) triangle 106 shows rectangular strips 701, 702, 703 and pivot pins 704, 705.

3. Hold the set square thirty/sixty-degree (30/60°) triangle 106 in front face view 714 position.

4. The set square thirty/sixty-degree (30/60°) triangle 106 first rectangular strip 701 can be opened by being rotated towards the right position around the pivot pin 704 and second rectangular strip 702 can be opened by rotating it towards the left position around the pivot pin 705 as shown in elements 716, 718 and 720.

5. In a fully open position the set square thirty/sixty-degree (30/60°) triangle 106 is in triangle form as shown in element 720. A set square thirty/sixty-degree (30/60°) triangle 106 is attached in an open position by a magnetic lock 360 around pivot pins 704,705 and around the top edges. A magnetic lock 360 mechanism attaches the set square thirty/sixty-degree (30/60°) triangle 106 right side by the first rectangular strip 701 and third rectangular strip 703 around pivot pin 704 in the open position. Similarly, a magnetic lock 360 attaches the left side second rectangular strip 702 and third rectangular strip 703 around pivot pin 705 in the open position. The magnetic lock 360 also attaches the first rectangular strip 701 and second rectangular strip 702 around top edges in the open position.

The set square thirty/sixty-degree (30/60°) triangle 106 is attached in an open position by a magnetic lock 360 around two pivot pins 704, 705 and top edges of 701, 702.

The set square thirty/sixty-degree (30/60°) triangle 106 can be closed by following the steps 3, 4 and 5 in reverse order and then inserting and storing it in any of the 4 empty cavities in the second portion of the hollow body 128.

Figure 8:
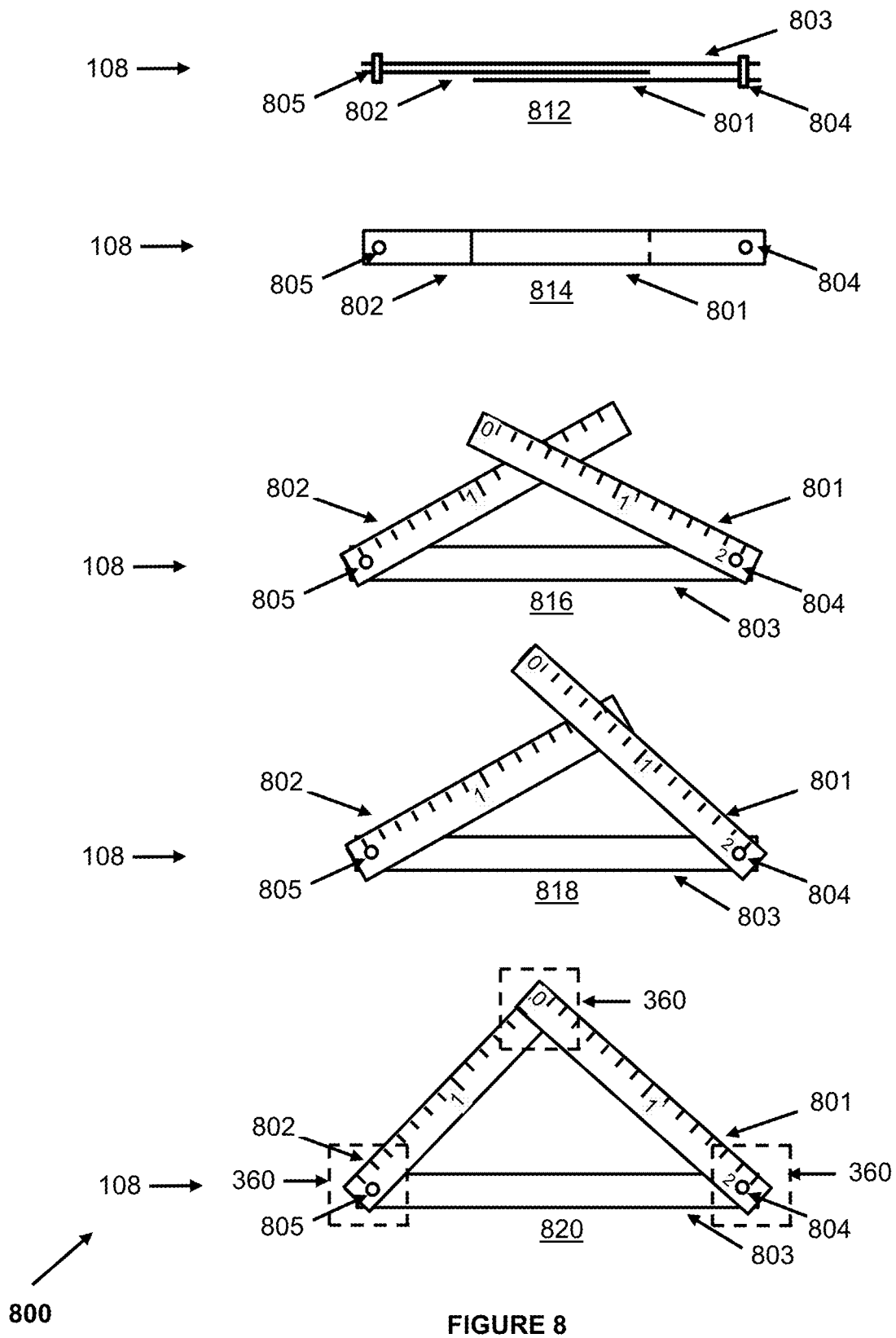
FIG. 8 illustrates an example top view and front view of a multifunctional writing device showing steps to open and close a set square forty-five-degree (45°) triangle, according to some embodiments.

FIG. 8 illustrates an example top view and front view 800 of a multifunctional writing device 100 showing steps to open and close a set square forty-five-degree (45°) triangle 108, according to some embodiments.

FIG. 8 illustrates the opening and closing of a set square forty-five-degree (45°) triangle 108. The principle of operation to open a set square forty-five-degree (45°) triangle 108 is similar to that of opening of arms, which can be opened or closed around two pivots.

The components of the set square forty-five-degree (45°) triangle 108 is shown in the top view 812. It consists of rectangular strips 801, 802, 803 and pivot pins 804, 805. In a fully open position, the rectangular strips form a set square forty-five-degree (45°) triangle 108 with the aim of providing a straightedge at a right angle or other particular planar angles to a baseline.

The set square forty-five-degree (45°) triangle 108 two rectangular strips 801, 802 revolve around two pivot pins 804, 805 to open or close.

The steps to open a set square forty-five-degree (45°) triangle 108 are as follows:

1. First remove the cap 124 from multifunctional device 100 by slightly twisting it to the left.
2. Pull the set square forty-five-degree (45°) triangle 108 by grasping the accessible rectangular strip top portion 134 with fingers, from multifunctional device 100. The top view 812 of the set square forty-five-degree (45°) triangle 108 shows rectangular strips 801, 802, 803 and pivot pins 804, 805.
3. Hold the set square forty-five-degree (45°) triangle 108 in front face view 814 position.
4. The set square forty-five-degree (45°) triangle 108 first rectangular strip 801 can be opened by being rotated towards the right position around the pivot pin 804 and second rectangular strip 802 can be opened by being rotated towards the left position around the pivot pin 805 as shown in elements 816, 818 and 820.
5. In a fully open position the set square forty-five-degree (45°) triangle 108 is in triangle form as shown in element 820. A set square forty-five-degree (45°) triangle 108 is attached in an open position by a magnetic lock 360 around pivot pins 804,805 and around the top edges. A magnetic lock 360 mechanism attaches the set square forty-five-degree (45°) triangle 108 right side by the first rectangular strip 801 and third rectangular strip 803 around pivot pin 804 in the open position. Similarly, a magnetic lock 360 attaches the left side second rectangular strip 802 and third rectangular strip 803 around pivot pin 805 in the open position. The magnetic lock 360 also attaches the first rectangular strip 801 and second rectangular strip 802 around top edges in the open position.

The set square forty-five-degree (45°) triangle 108 are attached in an open position by a magnetic lock 360 around two pivot pins 804, 805 and top edges 801, 802.

The set square forty-five-degree (45°) triangle 108 can be closed by following the steps 3, 4 and 5 in reverse order and then inserting and storing it in any of the 4 empty cavities in the second portion of the hollow body 128.

Figure 9:
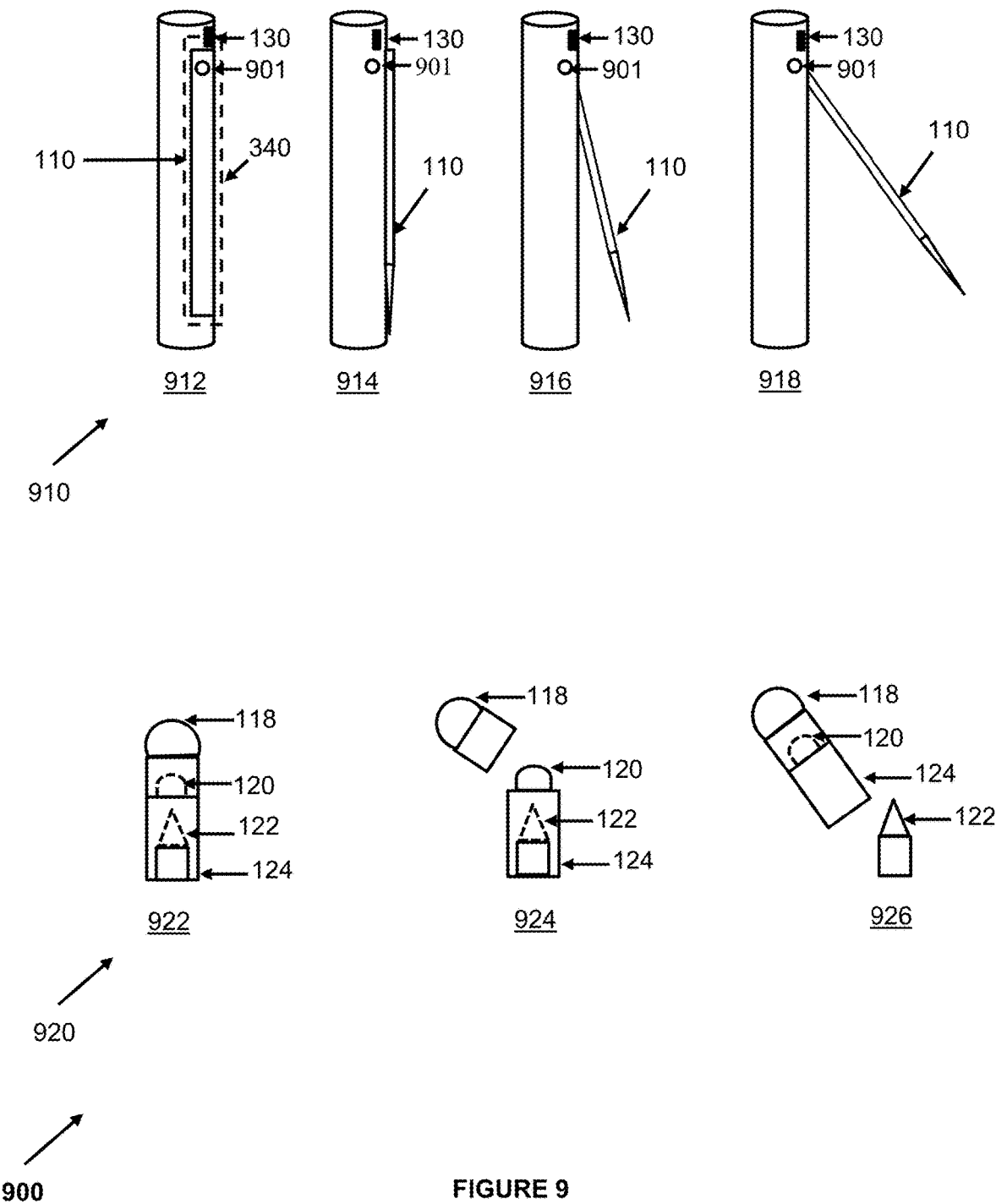
FIG. 9 illustrates an example front view of a multifunctional writing device showing steps to open and close a compass needle and access stylus and pen, according to some embodiments.

FIG. 9 illustrates an example front view 900 of a multifunctional writing device 100 showing steps to open and close a compass needle 110, and ways to access the stylus 120 and pen 122, according to some embodiments.

FIG. 9 consists of detail working of compass needle 110, stylus 120 and pen 122.

Element 910 illustrates the opening of a compass needle 110 method. The principle of operation is similar to handheld divider which can be opened around a pivot pin 901.

Element 912 shows a compass needle 110 attached and stored in a compass needle cavity in the first portion of the hollow body 128. A magnetic lock 340 mechanism attaches the compass needle 110 to the compass needle cavity in the first portion of the hollow body 128.

The compass needle 110 revolves around a pivot pin 901 to open or close.

The steps to open a compass needle 110 are as follows:
1. Press the compass needle push button 130, to release the compass needle 110 as shown in element 914.
2. Pull the compass needle 110 by grasping with fingers and pulling the needle portion outward from multifunctional device 100 as shown in element 916.
3. The compass needle 110 is held to any open position by the screw on the hinge which attaches the compass needle 110 in its position. The hinge stiffness around pivot pin 901 ensures compass needle 110 to remain open at the desired arc length during use as shown in element 918.

The compass needle 110 can be stored inside the cavity by simply pushing it towards the hollow body 128.

The compass needle 110 is attached by a magnetic lock 340 and stored in a compass needle cavity in the first portion of the hollow body 128.

Element 920 illustrates how to access the stylus 120 and pen 122.

The tip of the second portion of the hollow body 128 comprises an eraser cap 124 over a tip of the pen 122 system.

The eraser cap 124 also comprises a stylus 120.

As shown in element 922, the eraser cap 124 contains eraser 118, stylus 120 and tip of the pen 122. Eraser 118 can be used for removing pencil-material and/or ink writing from paper. Eraser 118 can be included in a removable cap over writing instrument pen 122. Eraser 118 can be made from synthetic rubber, synthetic soy-based gum, vinyl, plastic, or gum-like materials.

Element 922 shows the tip of the second portion of the hollow body 128 comprising an eraser cap 124 over a tip of the pen 122 system.

Element 924 shows how a stylus 120 can be accessed by removal of an eraser 118 section by simple anti-clockwise twist.

Element 926 shows how a pen 122 can be accessed by removal of the entire eraser cap 124 with simple anti-clock twist.

Figure 10:
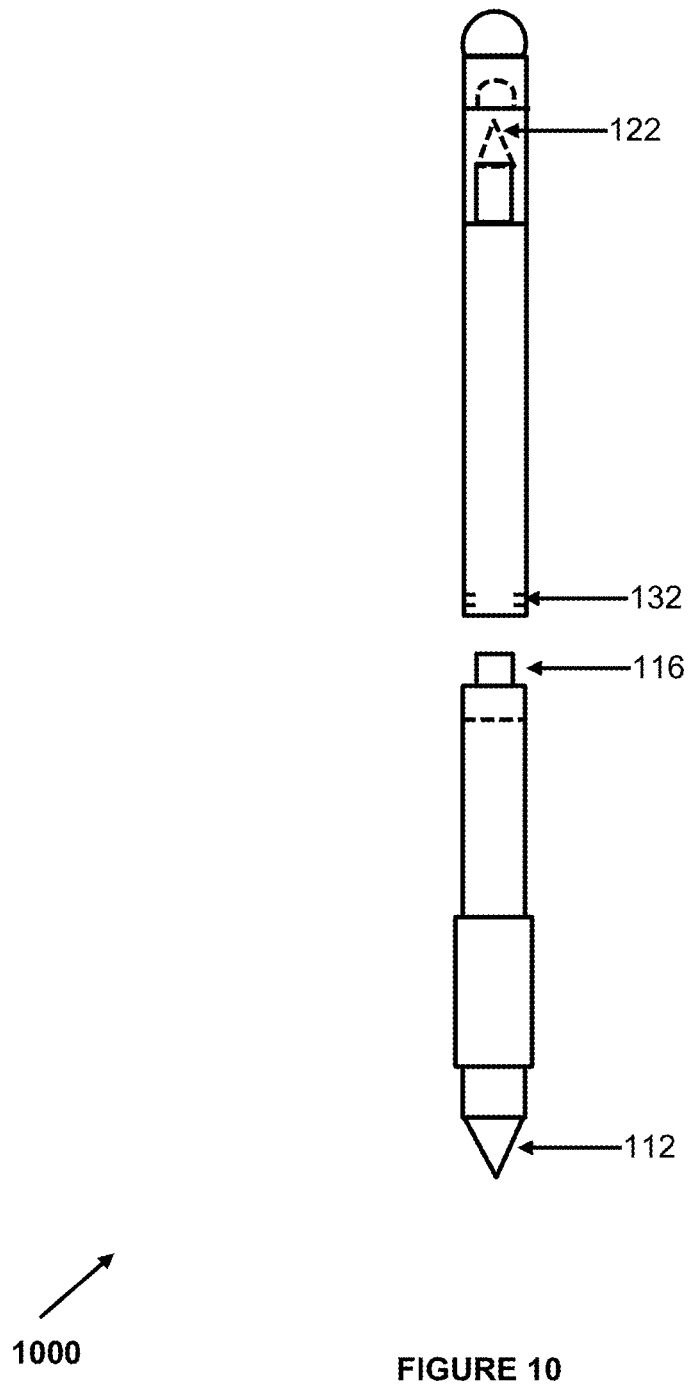
FIG. 10 illustrates another example front view of a multifunctional writing device showing a USB port, according to some embodiments.

FIG. 10 illustrates another example front view 1000 of a multifunctional writing device 100 showing a USB flash drive 116, according to some embodiments.

The USB flash drive 116 is stored in the first portion of the hollow body 128 of the multifunctional writing device 100. The pen 122 and pencil 112 can be separated into two pieces near the bottom of the USB flash stick 116 by a simple twist around the screw thread 132. USB flash drive has standard USB male plug for data storage. Inside the small casing is the hardware circuitry to store data and communicate with the USB male plug.

CONCLUSION

A multifunctional writing device comprising a hollow body, wherein the hollow body comprises one or more cavities configured to store a protractor, a ruler, a set square thirty/sixty-degree (30/60°) triangle, a set square forty-five-degree (45°) triangle, a compass needle, a USB flash drive, a stylus, and an eraser. All of these multifunction writing devices components are stored in a single tubular housing.

A first writing member comprises lead and a mechanical pencil system being provided in a first portion of the hollow body. A second writing member comprising a pen system being provided in a second portion of the hollow body.

A magnetic lock attaches and stores a protractor, a ruler, a set square thirty/sixty-degree (30/60°) triangle, a set square forty-five-degree (45°) triangle, and a compass needle inside a cavity.

A protractor, a ruler, a set square thirty/sixty-degree (30/60°) triangle, and a set square forty-five-degree (45°) triangle are removed from a cavity by pulling rectangular strip top portion and used independently.

Example embodiments allow the user to store multifunctional writing devices in a single tubular housing and quick removal from the storage cavity with effortless methods to open and close a tool. The multifunctional writing device is light weight and can be used on paper and paperless medium.

Although the present embodiments have been described with reference to specific example embodiments, various modifications and changes can be made to these embodiments without departing from the broader spirit and scope of the various embodiments.

The invention claimed is:

1. A multifunctional writing device comprising:
   a hollow body, wherein the hollow body comprises one or more cavities configured to store a protractor, a ruler, a set square thirty/sixty-degree (30/60°) triangle, a set square forty-five-degree (45°) triangle, a compass needle, a USB flash drive, a stylus, and an eraser;
   a first writing member comprising a first writing tip, wherein the first writing member comprises lead and a mechanical pencil system being provided in a first portion of the hollow body, and wherein the first writing tip is axial with respect to the hollow body;
   a second writing member comprising a second writing tip, wherein the second writing member comprises pen system being provided in a second portion of the hollow body, and wherein the second writing tip is axial with respect to the hollow body, and wherein the first portion of the hollow body is at an opposite end of the second portion of the hollow body;
   a pivot pin system which allows to open or close a protractor, a set square thirty/sixty-degree (30/60°) triangle, a set square forty-five-degree (45°) triangle, and a compass needle;
   a hinge system which allows to open or close a ruler;
   a magnetic lock which attaches and stores a protractor, a ruler, a set square thirty/sixty-degree (30/60°) triangle, a set square forty-five-degree (45°) triangle, and a compass needle inside a cavity;
   a magnetic lock which attaches a protractor around a pivot pin, a ruler around a hinge, a set square thirty/sixty-degree (30/60°) triangle around two pivot pins and top edges, and a set square forty-five-degree (45°) triangle around two pivot pins and top edges in an open position;
   wherein a magnetic lock is formed when a permanent magnet object attaches itself to a ferromagnetic material made object; and
   wherein a magnetic lock is formed when two permanent objects with opposite polarities attach to each other.

2. The multifunctional writing device of claim 1, wherein a protractor is magnetically attached and stored in a protractor cavity in the second portion of the hollow body.

3. The multifunctional writing device of claim 2, wherein a ruler is magnetically attached and stored in a ruler cavity and runs adjacent to the protractor cavity in the second portion of the hollow body.

4. The multifunctional writing device of claim 3, wherein a set square thirty/sixty-degree (30/60°) triangle is magnetically attached and stored in a set square thirty/sixty-degree (30/60°) triangle cavity and runs adjacent to the ruler cavity in the second portion of the hollow body.

5. The multifunctional writing device of claim 4, wherein a set square forty-five-degree (45°) triangle is magnetically attached and stored in a set square forty-five-degree (45°) triangle cavity and runs adjacent to the set square thirty/sixty-degree (30/60°) triangle cavity in the second portion of the hollow body.

6. The multifunctional writing device of claim 5, wherein a protractor, a ruler, a set square thirty/sixty-degree (30/60°) triangle, and a set square forty-five-degree (45°) triangle in a closed position is magnetically attached and stored inside any cavity in a second portion of the hollow body.

7. The multifunctional writing device of claim 6, wherein a protractor, a ruler, a set square thirty/sixty-degree (30/60°) triangle, and a set square forty-five-degree (45°) triangle are removed from a cavity by pulling rectangular strip top portion.

8. The multifunctional writing device of claim 7, wherein a protractor slats revolve around a pivot pin to open or close.

9. The multifunctional writing device of claim 8, wherein a protractor is attached in an open position by a magnetic lock around a pivot pin.

10. The multifunctional writing device of claim 9, wherein a ruler has a bifold hinge between two rectangular strips to open or close.

11. The multifunctional writing device of claim 10, wherein a ruler is attached in an open position by a magnetic lock around a bifold hinge.

12. The multifunctional writing device of claim 11, wherein a set square thirty/sixty-degree (30/60°) triangle two rectangular strips revolve around two pivot pins to open or close.

13. The multifunctional writing device of claim 12, wherein a set square thirty/sixty-degree (30/60°) triangle is attached in an open position by a magnetic lock around two pivot pins and top edges.

14. The multifunctional writing device of claim 13, wherein a set square forty-five-degree (45°) triangle two rectangular strips revolve around two pivot pins to open or close.

15. The multifunctional writing device of claim 14, wherein a set square forty-five-degree (45°) triangle are attached in an open position by a magnetic lock around two pivot pins and top edges.

16. The multifunctional writing device of claim 15, wherein a compass needle revolves around a pivot pin to open or close.

17. The multifunctional writing device of claim 16, wherein a compass needle is attached by a magnetic lock and stored in a compass needle cavity in the first portion of the hollow body.

18. The multifunctional writing device of claim 17, wherein the tip of the second portion of the hollow body comprises an eraser cap over a tip of the pen system.

19. The multifunctional writing device of claim 18, wherein an eraser cap comprises a stylus.

20. The multifunctional writing device of claim 19, wherein a USB flash drive is stored in the first portion of the hollow body.

* * * * *